United States Patent [19]  [11] Patent Number: 4,919,224
Shyu et al.  [45] Date of Patent: Apr. 24, 1990

[54] AUTOMATIC WORKING VEHICULAR SYSTEM

[75] Inventors: Jia-Ming Shyu; Chih-Li Chang, both of Hsin Chu Hsien, Taiwan

[73] Assignee: Industrial Technology Research Institute, Hsin Chu Hsien, Taiwan

[21] Appl. No.: 191,974

[22] Filed: May 9, 1988

[51] Int. Cl.$^5$ .............................. B60T 7/16
[52] U.S. Cl. .................. 180/168; 56/10.2; 56/DIG. 15; 364/424.02
[58] Field of Search ............ 180/167, 168, 169; 318/587; 364/424.01, 424.02; 56/10.2, DIG. 15

[56] References Cited

U.S. PATENT DOCUMENTS

| 3,381,456 | 5/1968 | Taylor | 56/10.2 |
| 3,425,197 | 2/1969 | Kita | 180/79.1 |
| 3,744,586 | 7/1973 | Leinauer | 180/169 |
| 3,840,086 | 10/1974 | Burton | 180/79.1 |
| 3,924,389 | 12/1975 | Kita | 56/10.2 |
| 4,133,404 | 1/1979 | Griffin | 180/169 |
| 4,180,964 | 1/1980 | Pansire | 56/10.2 |
| 4,537,271 | 8/1985 | Ito et al. | 180/169 |
| 4,545,453 | 10/1985 | Yoshimura et al. | 180/131 |
| 4,694,639 | 9/1987 | Chen et al. | 56/10.2 |
| 4,729,449 | 3/1988 | Holmquist | 364/424.02 |

Primary Examiner—Charles A. Marmor
Assistant Examiner—Eric Culbreth
Attorney, Agent, or Firm—Cushman, Darby & Cushman

[57] ABSTRACT

An automatic working vehicular system comprises a guiding signal device and an automatic working vehicle which has a power source, driving devices, detecting devices and control devices. By means of a guide wire device for limiting the operational area, the vehicle can start at a preset time, travel from a position in a garage to a specific operation site, complete the required range of operation along a parallel reciprocating course of travel, and return to the garage. The vehicle also comprises devices to control the garage door, detect the fuel level, return itself to the garage when raining, adapt to load variations, change speed automatically, warn moving obstacles, detour obstacles, and prevent its theft.

9 Claims, 5 Drawing Sheets

AUTOMATIC WORKING VEHICULAR SYSTEM

BACKGROUND OF THE INVENTION

This invention relates to a fully automatic working vehicle comprising a time setting means, and automatic travel devices. This vehicle can move from its garage to the operation site, automatically controlling its course of travel (detouring obstacles and restricted areas) and operation, and return automatically to the garage. No personal supervision is required. Its typical embodiment is a fully automatic lawn mower.

The lawn mower has gradually developed —back-carried, hand-pushed, self-propelled, riding—and the burden to the operator has been considerably reduced. However the route of each lawn mower had to be controlled by a person. Further, a remote control type mower, like U.S. Pat. No. 4,545,453 requires an operator. Therefore, a lawn mower which can be operated automatically, without manpower or personal supervision, has become the final object of such development.

U.S. Pat. Nos. 3,425,197 and 4,133,404 disclose a lawn mower mounted with a device for detecting a margin position between the mowed area and the unmowed area to automatically guide the mower in circles (outside in or inside out) until the lawn is mowed within an area. However, its operation must be controlled by a person in the initial mowing circle, thus requiring some manpower. In U.S. Pat. No. 4,133,404, a mower comprises a function for detouring obstacles on the lawn, but the external area around the obstacle should be mowed in advance.

By means of memory and reproduction devices to produce signals for controlling the route, U.S. Pat. No. 3,840,086 discloses the use of recording tapes for route record and control. Republic of China Patent Application No. 7410043 employs a pen mounted upon a paper reel device for making a route record which then is read by a photoelectric cell in order for a servo-control to reproduce the route. However, such methods are based on preset procedures to control the machine's course of travel. Therefore, circumstances such as an incorrect starting position or direction, wheel slippage during travel, or touching an obstacle, will cause a deviation from the preset route and potential injury. Thus, the routing method with an open-loop control is deemed impractical.

The machine according to U.S. Pat. No. 4,180,964 comprises a metal wire (band) laid in a desired path as a conductor for controlling the pendulous position of a magnet on the lawn mower. Using electrical contact points and relevant mechanisms to correct its direction, the lawn mower moves along the wire. This technique is well-known and used in automation plants. Current in the wire generates an alternating magnetic field which induces the coils on the automatic vehicle to control the vehicle's movement. However, if this control method is used to control an entire lawn mowing route, a wire must be laid along the entire lawn mowing route, and obviously, it also is not practical.

Closed-loop control devices like directional detecting devices (such as a gyrocompass, infra-red, and/or ultrasonic waves) for detecting relative direction and distance in reference to points, or a vision device for multisensing are still at the laboratory stage because installation is complicated, reliability is unsatisfactory, and costs are high. Therefore, a low cost and reliable route control method is pending for presentation.

The achievement of the above-mentioned route control is only a part of the requirement of an automatic vehicle; in fact, a fully automatic vehicle must start automatically at a preset time, leave its parking place (e.g., a garage) for a starting position at the job site, and begin working. According to conditions at the job site, the fully automatic vehicle can perform various control functions, such as change speed, detour still obstacles, or restricted areas, and stop and warn objects moving through its path. Upon completion, or encountering an exceptional condition (insufficiency of fuel, rain, the job site being too wet), it will stop work automatically and return to the original parking place. In addition, the fully automatic vehicle has a burglar-proof function so that it can operate without any supervision at the job site.

SUMMARY OF THE INVENTION

The object of the present invention is to provide a fully automatic vehicle to solve the abovementioned problems, i.e., to provide a simple and reliable route control device for a vehicle.

Another object of the present invention is to provide a vehicle which will start at a preset time, drive to the work site, and return to the garage.

A further object of the present invention is to provide a vehicle which is impact-proof, burglar-proof, shielded from rain, and prevents incidental failure.

To achieve the above-mentioned objects, a working vehicle according to the present invention has a power source and a transmission device which activates an operational device and wheel mechanism for proper running, in order to perform work and travel. A first wire is laid from the parking place of the vehicle to the starting point at the job site. A second wire is laid around the job site, and a third wire is laid around the external edge of the restricted areas (e.g., water pond, flower gardens, etc.) located within the job site. The three wires are fed with different alternating current at a 1st, 2nd and 3rd frequency.

Induction coils are mounted on the front and rear ends of the vehicle for detecting the location of the wires to guide the vehicle to and from the parking place, and around the restricted areas. A microcomputer controller starts the power source of the vehicle according to a preset timer, and, via a route servo-mechanism, pilots the vehicle to the job site along the 1st frequency wire. The vehicle then continues to mow the first path along one side of the job site until it reaches the second frequency wire, which reroutes the vehicle in the opposite direction. Thus, the interior of the job site is mowed in a parallel back and forth manner. Specifically, after the vehicle reaches the second frequency wire, it moves sideways one operational width, and then proceeds back in an opposite direction parallel with the edge of the already-mowed area until reaching the second frequency wire at the other end of the lawn. Then, it will once again move sideways one operational width, and proceed across the lawn. This method of operation will be repeated again and again until all the areas within the job site have been finished. Upon completion, the vehicle will return to the original parking place along the second and the first frequency wires. The above-mentioned parallel routing control is performed by a margin monitor mounted on the vehicle to trace the edge of the already mowed area to adjust the travel and operation route. When the vehicle encounters a restricted area on the route, (i.e., monitoring the 3rd frequency wire) it will turn around as if it encountered a second frequency wire and proceed back in an opposite parallel direction. The vehicle continues in this back and forth manner until one side of the restricted area is finished. Then, it will detour to the other side of the restricted area and continue to work. On the robot, an ultrasonic distance measuring device is mounted for detecting the peripheral distance. If the vehicle encounters an obstacle while moving in the forward direction, it would, according to its approaching speed, distinguish whether the object is moving or still. Accordingly, the vehicle will warn with a signal a moving object before continuing ahead and detour a still object as if the object were a restricted area. On the vehicle, a rain sensor and a fuel detector are installed to timely interrupt the work on rainy days, or when the ground is wet, or when the engine fuel (or other power energy) is nearly empty. If the work is interrupted, the vehicle will return to the original parking location along the second and first frequency wires. The location of the vehicle at the time of interruption will be recorded by the controller according to the back route distance, so that after the interrupt condition is over, the vehicle may return to that location and continue to operate. The vehicle also is furnished with a vibration monitor to be used during stop condition, and a secret code control procedure for manual starting, and an alarm, etc., for burglar-proof purposes. A detailed structure and other features and functions of the present invention will be described with reference to the following drawings.

Figure 1A:
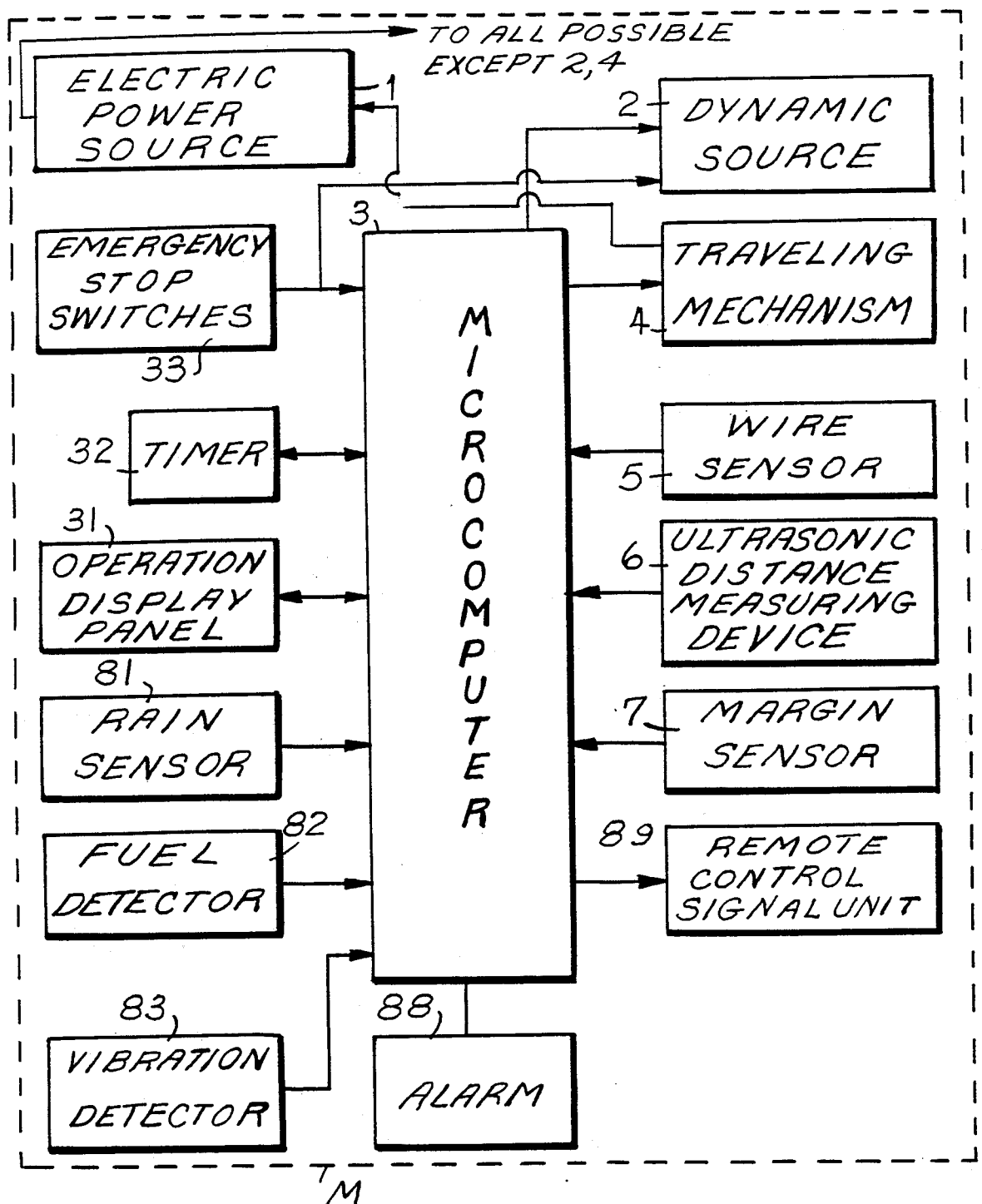
FIG. 1A is a block diagram of the vehicle according to the present invention.

DETAILED DESCRIPTION:

FIG. 1A shows the vehicle M of this invention. An electric power source 1 comprises an accumulator, a power supply and a charge circuit for storing and supplying the required power. A dynamic source 2 (a motor or an engine) is used to drive a travelling mechanism 4. Microcomputer 3 controls, via stored operational programs, the operation of the peripheral devices and commands specific procedures according to signals received from sensors (described in more detail later). For example, microcomputer 3 controls the travelling mechanism 4 to move forward, backward, and turn. An operation display panel 31 displays necessary operational information and, in addition, enables manual and automatic vehicle operations to be set and adjusted. One such operation which requires setting is the start time of the vehicle. According to this preset time (either a date or a periodic time), a timer 32 generates a signal to start a main switch of the vehicle. Timer 32 has an independent power supply, enabling it to measure time while the vehicle is parked and off. Emergency stop switches 33 (push-button and touch switches located throughout the vehicle) temporarily stop the vehicle in an emergency and can reset the vehicle following the emergency. Wire sensor 5 comprises several groups of coils mounted in front and rear ends of a machine body for sensing the alternating magnetic field of current wires paved on the ground in order to detect the location of the wires as the control data of the travelling route of the vehicle M. An ultrasonic distance measuring device 6 comprises several groups of supersonic transmission and reception units with calculating circuits for measuring the distance between the surrounding obstacles and the vehicle M, to detect the surrounding conditions during travelling. A margin sensor 7, having several capacitance or resistance sensors mounted on the left and right sides of the front and rear ends of the machine body, recognizes an edge of the already operated area according to the different electrical reaction between the operated area and the non-operated area. Margin sensor 7 furnishes the microcomputer 3 data to control parallel movement of the travelling mechanism 4 of the vehicle M. Together, the above-mentioned wire sensor 5, ultrasonic distance measuring device 6 and margin sensor 7 furnish the routing control data for vehicle M (their functions to be described later). By means of the electrical variations of the resistance or capacitance element, a rain sensor 81 detects rain or wet ground. The moisture or water on the sensor may be cleaned and dried (for instance, with a heating method); thus, when the rain sensor detects water continuously because it is raining or the job site is too wet, it signals the microcomputer 3 which then performs a control procedure to stop the operation and return the machine to the parking area. If the vehicle M uses an engine to obtain dynamic power, a fuel detector 82 will be installed on the oil tank. When it detects the fuel running out, it will instruct the microcomputer 3 to stop the operation and return vehicle M to the parking area. A vibration detector 83 is used to monitor tampering while the vehicle is parked. Therefore, if the machine body is tampered with by a stranger, the vibration detector 83 will send out a warning signal by means of an alarm 88. The vibration detector 83 and alarm 88 will be turned on to tamperproof the vehicle M after the microcomputer 3 has stopped its operations. The alarm 88 also is used to warn obstacles when encountered by the vehicle M during operation.

A user, after manually starting the machine, must key in to the microcomputer 3, via the operation and display panel 31, a user secret code. If the code is recognized, the microcomputer 3 will accept the next instruction and turn off the power supply of the vibration detector 83. However, if a wrong code is keyed in repeatedly, the alarm 88 will be turned on.

A remote control signal unit 89 enables the vehicle M to remotely control related peripheral devices, such as opening and closing the garage door, turning on a power supply of a guiding signal generator 100 before leaving the garage, and turning off the power supply after returning to the garage.

Figure 1B:
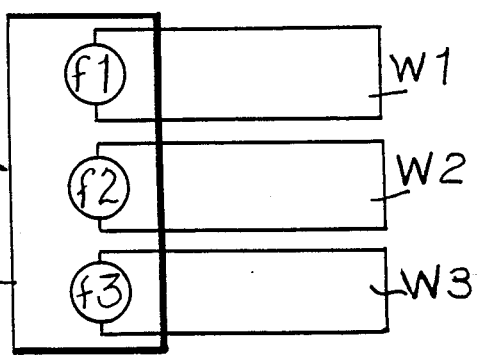
FIG. 1B is a block diagram of the guiding signal device according to the present invention.

In FIG. 1B, a guiding signal device S comprises a signal generator 100 and out-connected alternating current wires W1, W2, W3 at different frequencies f1, f2, f3, respectively.

The above-mentioned rain-sensor 81, fuel detector 82, vibration detector 83, alarm 88 and the remote control signal unit 89 all can be furnished with conventional methods, and therefore, are not described in detail herein.

The structure according to the present invention will be described with the embodiment of a lawn mower, of which the top view and side view are respectively shown in FIG. 2 and FIG. 3. Lawn mower M comprises a frame 9, having a base plate 91, a guardrail 92 and a protective cover 93. Guardrail 92 has an extension handle 921 for manually pushing and pulling the lawn mower. A cutting knife 40 is mounted beneath base plate 91 and is driven with an engine 20, which is mounted on the top of the base plate 91. A grass outlet 401 is located at one side of the base plate 91 to provide an exit for cut grass. Two pilot wheels 46 installed in the front part F of the base plate 91, are guided with a steering device 45. Two driving wheels 44, mounted in rear end B of the base plate 91 are driven through differential gears by a transmission 49, powered by the engine 20. The pilot wheels 46, driving wheels 44, steering device 45 and transmission 49 constitute the operational and travelling mechanism 4 (FIG. 1A) and are all controlled by the microcomputer 3. (This structure will be further described in FIG. 4). The front F and rear B ends of the base plate 91 are mounted with touch switches 331 and 332, respectively, to provide an emergency stop function. In other words, when the lawn mower M encounters and touches an obstacle during travel, it will stop moving forward and will detour instead. (Detour operation will be discussed later). Other portions of the machine have at least one push-button emergency stop switch (not shown) for manual control, which can stop temporarily the engine of the lawn mower (i.e., the power of the cutting knife, wheels of the machine, etc.). However, the mower will maintain its existing operational condition and will not detour.

Several groups of an ultrasonic distance measuring device 6 are mounted as illustrated at the four corners of the guardrail 92. At each corner, two sets of ultrasonic transmitters and receivers are mounted facing to the sides, to the front, or to the rear to detect and measure the distance between the machine body and obstacles in these directions. This distance data is used by the microcomputer 3 for impact-proof, detour and location procedures during travel.

On the front end F and rear end B of the base plate 91, a group of grass-length (margin detection) sensors 7 and 7' each having several sensing probes, and wire sensors 5 and 5' are respectively mounted. The wire sensors 5 and 5' are mounted at a proper height above ground G. Four capacitance proximity switches 71, 72, 73, and 74 generate different induction signals depending on whether the grass of ground G is cut C or uncut UC. As the lawn mower M cuts grass along the edge of a marginal line L according to the already cut grass C, switches 71 and 72 are used for sensing the cut grass and switches 73 and 74 are used for sensing the uncut grass. Thus, marginal line L is located between the switches 72 and 73 under the correct routing condition. However, when the marginal line L shifts towards switches 71 or 74, alteration of the induction signals will control the steering device 45 via the microcomputer 3, and operate the pilot wheels 46 to correct the route.

Since the lawn mower at the job site travels in a parallel back and forth manner, grass-length (margin detection) sensor 7 and wire sensor 5 control the lawn mower's forward moving, and grass-length (margin detector) sensor 7' and wire sensor 5' control the mower's backward movement. Specifically, when the lawn mower is cutting grass in a reciprocating parallel pattern, its forward and backward movement is controlled according to the alternating current at a specific frequency sensed by the wire sensors 5 and 5', respectively.

The wire sensor 5 on the front end F also controls the direction of the lawn mower when moving forward along a wire W. Therefore, the front end wire sensor 5 comprises at least two coils 51, 52 (as shown in the FIG. 2) for sensing a deviation from the wire W located on the ground G between the coils to adjust and control the direction of the pilot wheels 46. The wire sensor 5' of the rear end B is only for signal detection, and therefore requires only one coil.

A starting motor linked with the engine 20, a generator 21 and an accumulator/power supply 10 also are mounted on the machine.

The operation and display panel 31 is installed in the vicinity of the handle 921. It is removable or has a protective cover to avoid being exposed and operated by a non-authorized person.

The rain sensor 81, the fuel detector 82, the vibration detector 83, the alarm 88 and the remote control signal unit 89 are mounted on the machine, but are not illustrated in the figures.

Figure 4:
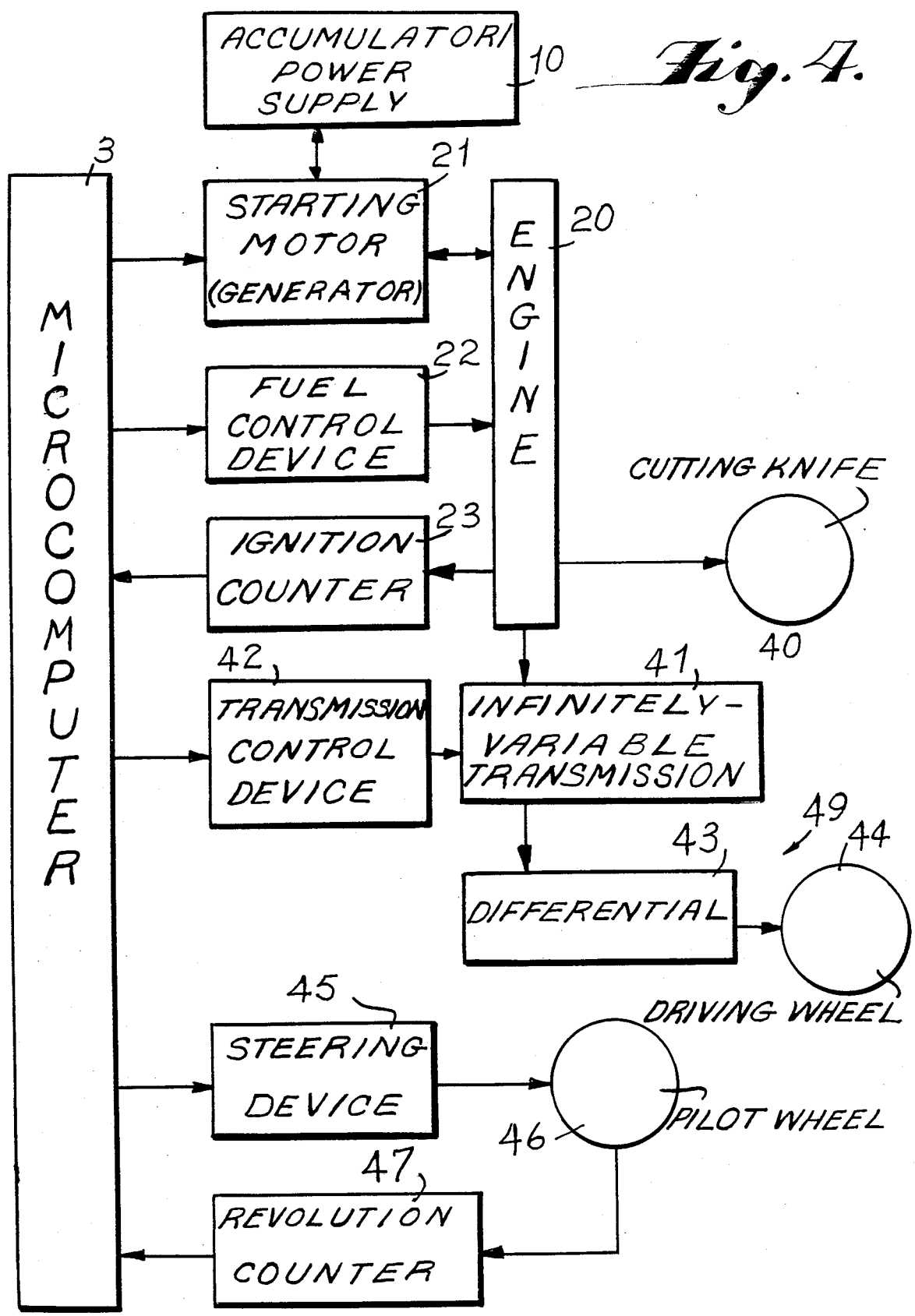
FIG. 4 is a block diagram of the mowing and travelling mechanism on the lawn mower according to the present invention.

The structure and functions of the operation and travelling mechanism of the embodiment according to the present invention are further described with respect to FIG. 4. The engine 20 is started by the starting motor 21, if a permanent magnetic type, can be converted to a generator. An accumulator/power supply 10 is employed to retrieve and store the generated power. The speed of the engine 20 will be adjusted by the fuel control device 22 according to signals from the microcomputer 3. An ignition counter 23 provides the speed feedback signal from the engine 20 to the microcomputer 3. Accordingly, the engine 20 is maintained at an idle speed when the lawn mower is stopped or adjusted to a proper operational speed for travelling and cutting. The power of the engine 20 directly drives the cutting knife 40, and indirectly the driving wheels 44 located at the rear end B of the base plate 91 through a transmission 49 and a differential 43. The transmission 49 has an infinitely-variable transmission 41, which can operate forward, backward and at zero speed, and a transmission control device 42, which receives control signals from the microcomputer 3. The infinitely-variable transmission 41 can be achieved by conventional means, such as a differential speed device made of planetary gear sets and a belt pulley set, or a variable speed device made of a friction wheel by functioning at different radial locations on a driving disc, etc., which are known techniques and will not be described in detail herein. The output of the infinitely-variable transmission 41 is, by means of the differential 43, coupled to two driving wheels 44.

The two pilot wheels 46 located on the front end F of the base plate 91 achieve the travelling and steering functions of the lawn mower. The pilot wheels 46 are driven with the steering device 45 according to signal from the microcomputer 3 (the steering device 45 can be made with a known Ackerman link mechanism and an actuator). The pilot wheels 46 are driven to rotate while the machine is moving; therefore, the revolution counter (r.p.m. counter) 47 is mounted thereon to count the revolution of the two plot wheels 46, enabling the microcomputer 3 to monitor the travelling speed of the lawn mower and to record the travelling distance and the steering condition as required. The travelling speed of the lawn mower is controlled as follows: If the speed of the engine 20 deviates from the expected revolution speed as a result of the variation of its load, the microcomputer 3 will actuate the fuel control device 22 and detect whether the speed can be adjusted; otherwise, the mower operates the transmission control device 42 to adjust the infinitely-variable transmission 41 to automatically control the speed.

Figure 5:
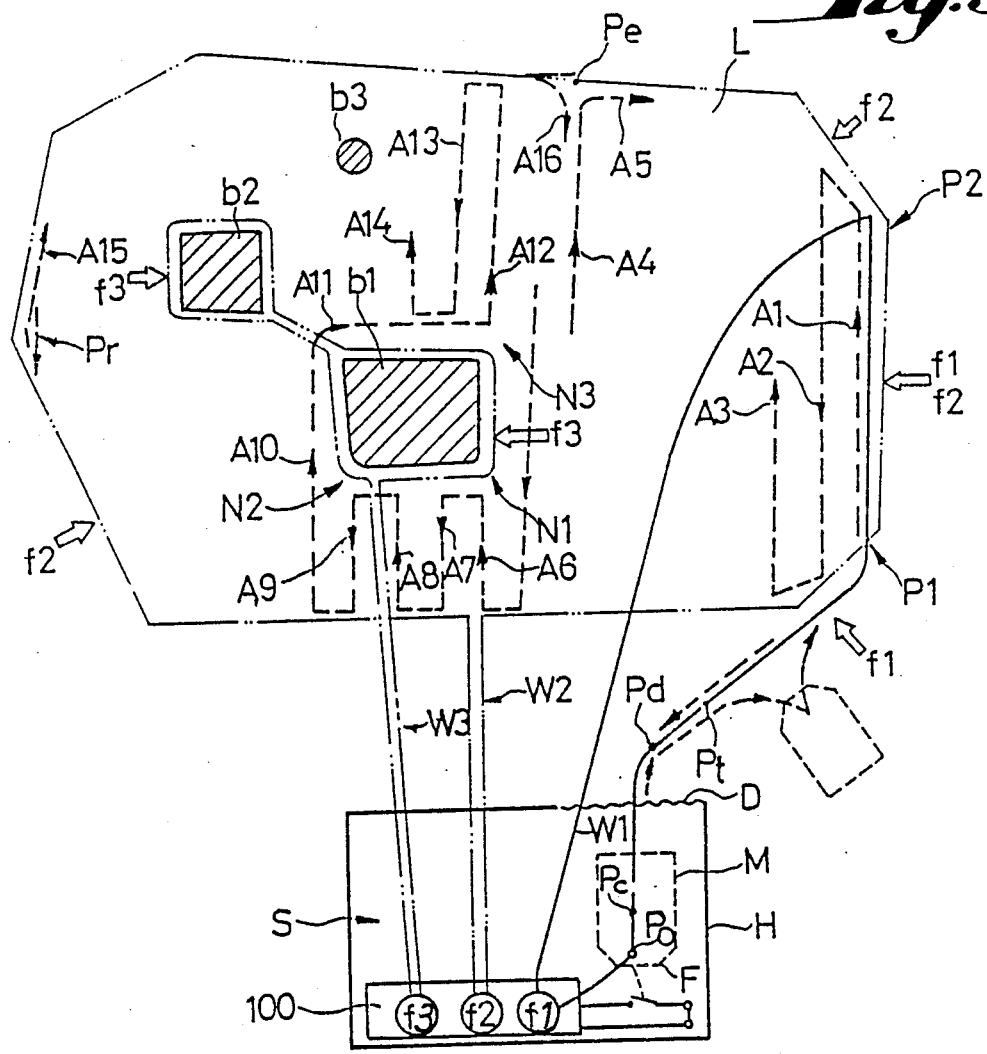
FIG. 5 is a functional diagram of the arrangement and control route of the guiding wires according to the present invention.

FIG. 5 describes the arrangement and function of the guiding signal device S according to the present invention. The signal generator 100 is installed inside the garage H where the lawn mower M is parked at location Po and its power supply turned off. When the lawn mower M starts to move out to cut the grass, the power of the signal generator 100 turns on and the generator outputs alternating current having at least three different frequencies f2, f2 and f3, respectively, through wires W2, W2 and W3 to provide routing control to the lawn mower M. After the lawn mower M has returned to the parking location Po, the power supply of the signal generator 100 is turned off. The first wire W1, which carries the first frequency f1 signal, guides the lawn mower M between the garage H and a lawn L. The current loop begins at the signal generator 100, passes through the first wire W1 to the parking location Po, the garage door D, and two points P1 and P2 of one side of the lawn L, and then returns to the signal generator 100 via a non-overlapping route. The second wire W2, which carries the second frequency f2, loops from the signal generator 100, around the lawn L in one turn, and back to the signal generator 100. Between the signal generator 100 and the edge of the lawn, the overlapped wires will offset the magnetic fields therein and will not be sensed by the lawn mower; therefore, the second frequency f2 will appear only at the boundary of the lawn L to define the boundary of the lawn. The first frequency f1 and the second frequency f2 appear jointly and parallel between P1 and P2 of one side of the lawn L, and instruct the lawn mower to finish cutting the first mowing path. The third wire W3, which carries the third frequency f3, begins at the signal generator 100, surrounds each of the barriers b1, b2 . . . within the lawn and returns to the generator. Between barriers and between the signal generator 100 and a barrier, the wire W3 overlaps to offset the magnetic fields therein. Thus, the barrier areas are defined by frequency f3. The wires W1, W2 and W3 are laid on the ground or underground at a proper depth, so long as they are not damaged. After the wires have been laid, and the lawn mower has been set initially, the mower can operate automatically. The initial setting comprises: setting the timer 32 (FIG. 1A); and setting the location of the lawn mower M with regard to the parking location Po in the garage H, the internal and external remote control points Pc, Pd of the garage door D, and the direction turning point Pt for the lawn mower prior to entering into the lawn L. The timer 32 is set when the microcomputer 3 (FIG. 1A) is first switched on by keying in the present time on the operation and display panel 31. From then on, the timer 32 will continue its clock function under independent power supply without any further setting, and will activate the main power supply of the lawn mower at a preset starting time to achieve automatic starting. The starting time can be set in two manners: a specific time and a periodic time. The specific time is preset to a specific date and time, while the periodic time is set at a certain period. If the lawn mower stops operation due to raining or fuel shortage, it can be preset to start again at the same time on the next day.

The parking location Po of the lawn mower M is determined by the ultrasonic distance measuring device 6 (FIG. 1A, FIG. 2, FIG. 3) and the microcomputer 3 which record the distance values from machine body to the peripheral doors, walls, etc.

When the lawn mower M returns to garage H via the first wire W2, its front end F faces in the opposite direction for the next mowing. Therefore, before starting the next run and entering into the lawn L, the lawn mower M turns around at a location Pt, either inside the garage H, or outside the garage H, as shown in FIG. 5. This turn-around is accomplished by the travelling mechanism 4 (FIG. 1A) through programs stored in the microcomputer 3. The lawn mower M actuates the remote control signal unit 89 (FIG. 1A) to open the garage door D before leaving, or shut the garage door D after entering the garage H when at the internal or external positions Pc and Pd. The ultrasonic distance measuring device 6 mounted on the lawn mower M monitors whether or not the garage door D is open. The above-mentioned specific positions Po, Pc, Pd and Pt, can be semi-permanently recorded by microcomputer 3 for repeated use according to the related distance among them. The positions also may be adjusted, if necessary.

As for the preset route of the first wire W1, point P1 at the entrance to the lawn L and the related locations of the above-mentioned points are relatively fixed; therefore, when the lawn mower M finishes its operation and returns to the first wire W2, it can return to the garage H by following the respective control points.

Figure 7:
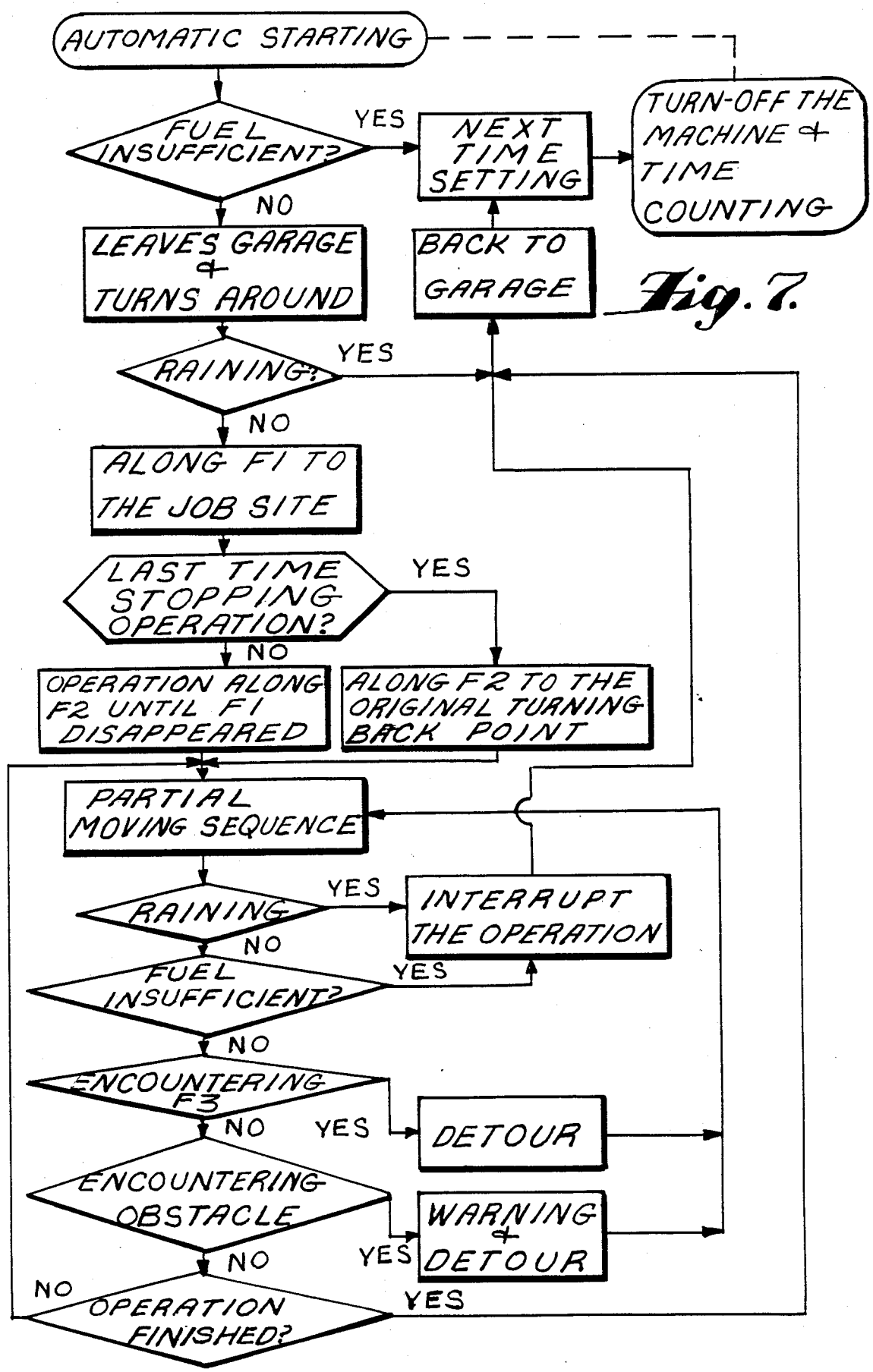
FIG. 7 is a flow chart of the automatic operation of the present invention.

The entire routing control procedures of the lawn mower now will be further described, referring specifically to FIG. 5 and generally the Flow Diagram in FIG. 7. The lawn mower M starts automatically in the garage H at a preset time. An inspection of machine conditions is performed to determine whether the lawn mower is ready to operate. For example, if the fuel is insufficient, the machine is reset to the next starting time and turned off. If conditions are normal, the lawn mower M will open the garage door, exit, and then turn around to its normal moving direction. At this time, if the rain sensor 82 (FIG. 1A) has detected rain, it will return to the garage, reset the timing and turn off the machine. If it is not raining, the lawn mower M will run according to the first frequency signal f1 of the first wire W1 to the P1 point of one corner of the lawn L. Starting from the point P1, where the first wire W1 and the second wire W2 overlap, the lawn mower M mows along the second frequency f2 signal of the second wire W1 to point P2, as shown by arrow A1. When the first frequency f1 signal disappears, the mower moves sideways, and then mows back along a second path (shown by arrow A2) by means of the guidance of the grass-length sensor 7' on the rear end B. When the rear end wire sensor 5' detects the second frequency f2 signal at the lawn boundary the machine moves sideways again and mows forward (as shown by arrow A3) according to the grass-length sensor 7. This operation then is repeated.

During the operation, the lawn mower simultaneously monitors whether the lawn is wet, or the fuel insufficient. If either condition is met, and after the machine has finished the last line operation (as shown by arrow A4), and reaching the second wire W2 location at the lawn ground boundary, (i.e., turning back point Pe), the mower M will turn onto the wire W2, and return to the garage H (as shown by arrow A5). The distance between the turn-back point Pe and the parking location Po is recorded, so that the mower M can return to point Pe and complete the lawn L on the next occasion.

When the lawn mower M in the lawn L encounters a barrier area b1, b2, etc., it senses the third frequency f3 signal. Therefore, after moving forward along arrow A6 and sensing the third frequency signal f3 of the barrier area b1 at the point N1, the lawn mower moves sideways and, according to the grass-length sensors, continues back and forth as shown by arrows A7, A8, A9 on one side of the barrier b1. At point N2, the machine has departed from the barrier b1, and will move to another side of the barrier b1 by moving along the third wire, W3 as shown by arrows A10, A11. According to the grass-length sensors, the machine continues to move from position N3 back and forth, as shown by arrows A12, A13, A14, on another side of the barrier b1. The machine will do the same when it encounters another barrier b2.

Figure 2:
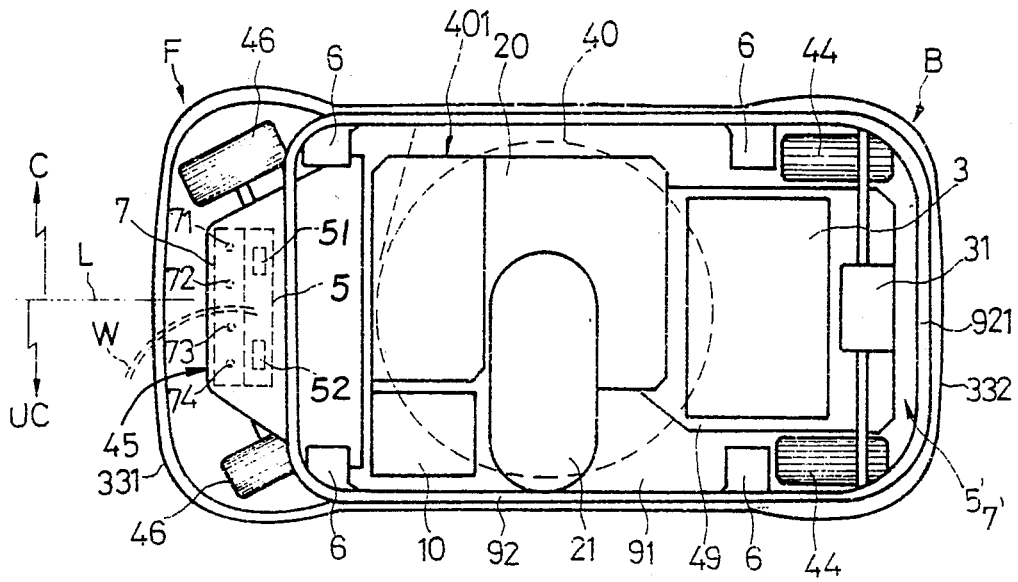
FIG. 2 is a top view of the embodiment of a lawn mower according to the present invention.
Figure 3:
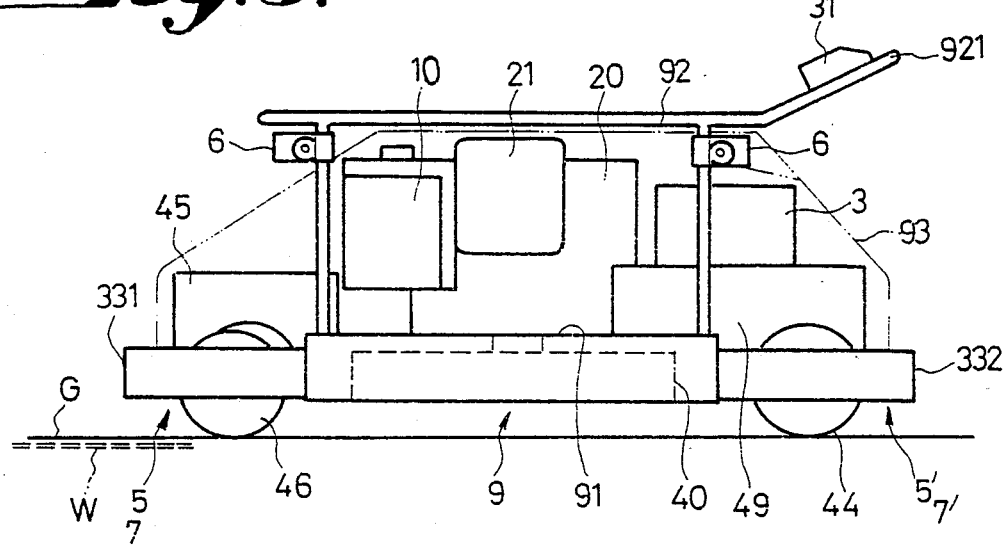
FIG. 3 is a side view of the embodiment of the lawn mower according to the present invention.

With the ultrasonic distance measuring device 6 (as shown in FIGS. 1A, 2, and 3), the lawn mower M can discern between still and moving objects. If the mower encounters a moving object b3 inside the lawn ground, such as a human being or an animal, it will first warn the moving object to leave, and then continue forward. On the other hand, if it encounters a still object, it will detour around the still object as it does a barrier. Upon completion of mowing the lawn (illustrated at point Pr), the lawn mower returns (shown by arrow 15) to the garage H along the second wire W2, and then the first wire W1.

The lawn mower M may also be operated manually by turning the switch on the operation/display panel 31 (FIG. 1A) from automatic to manual operation. After encoding the correct user secret code, it can be operated by controlling the respective keys on the operation/display panel 31, such as engine starting, moving forward or backward according to the specific frequency wire, moving sideways, changing speed, moving forward, backward, stop and turning, transmission of the remote control signal, setting and displaying the timer and the position date, etc. The arrangement of the keys on panel 31 can be achieved with conventional means, and will not be described in detail herein.

It should be noted that as the lawn mower M travels along the boundary of lawn L or the barrier areas b1, b2 and obstacle b3, its body maintains a direction that enables the grass outlet 401 (FIG. 2) to free the already-cut side so as not to disturb the operation in the uncut lawn area.

Figure 6:
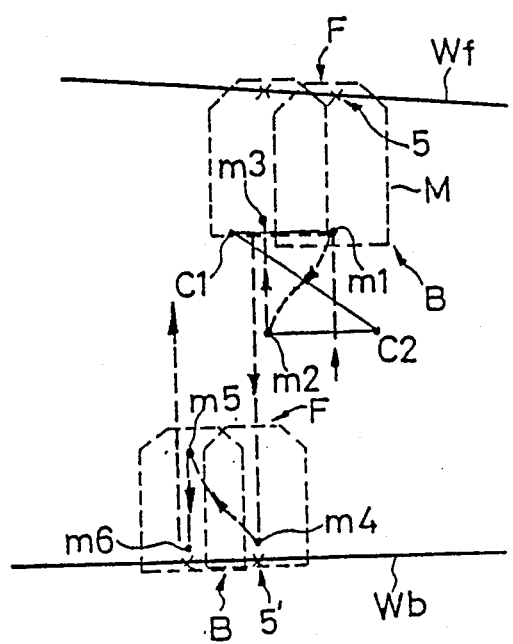
FIG. 6 illustrates an example of the route of the lawn mower upon reaching boundary wire.

However, a normal travelling mechanism, such as the embodiment of the present invention, cannot make direct sideward movement; instead, it is achieved through forward, backward and turning movement. Therefore, the various sideward moving dotted lines shown in FIG. 5 merely are symbolic lines and the detailed turning routes are illustrated in FIG. 6. The center of the wheel axis of the two driving wheels 44 (FIG. 2) under the rear end B of base plate 91 represents the moving route of the center point of the lawn mower M. A typical mowing route between wires $W_f$ and $W_b$ at the front and rear ends of the lawn mower M are indicated by $m_1$, $m_2$, $m_3$, $m_4$, $m_5$, and $m_6$. The route is constituted by portions of two opposite circles, having centers $C_1$ and $C_2$, plus one additional forward or backward movement, as shown in FIG. 6. Specifically, the lawn mower M first turns a given angle according to a circle having a turning center $C_1$, and then turns another angle according to a circle having center $C_2$. This movement enables the machine body to be parallel with the original direction, but one lateral space over. This principle usually is applied to a car when parallel parking, and is known to the person with ordinary skill. Thus, when the lawn mower M reaches the front wire $W_f$ position it makes two reverse angular turns, and then moves forward to the front wire $W_f$ to achieve a sideward movement. Similarly, when it reaches the rear wire $W_b$, it makes two reverse angular turns, and then moves backward to the rear wire $W_b$ to complete a sideward movement. This movement procedure is suitable for a vehicle having front wheels that turn and rear wheels that drive. Other kinds of vehicles can, of course, use other methods to achieve the sideward motion, and will not be described herein.

The above-mentioned embodiment according to the present invention is only used for describing this invention. In fact, any person skilled in the art may, based on the spirit of this invention, modify and alter the construction of the machine body, driving device and electrical construction, etc., and may use the control method according to this invention for other machines such as a crop harvester, snow sweeper, etc. However, such modification and alteration should be included in the scope of the claims of the present invention.

What is claimed is:

1. An automatic working vehicular system comprising:
(1) a guiding signal device comprising:
   a signal generator for generating a plurality of alternating currents having at least three different frequencies;
   a first wire carrying an alternating current at a first frequency, said first wire loops from said signal generator at a parking location to a first corner of a job site and along one side of the job site to a second corner thereof and back to said signal generator;
   a second wire carrying an alternating current at a second frequency, said second wire loops from said signal generator at the parking location and around an external circumference of the job site and back to said signal generator;
   a third wire carrying an alternating current at a third frequency, said third wire loops from said signal generator at the parking location and around an external circumference of each barrier area located within the job site; and
(2) an automatic working vehicle comprising:
   a frame having a front end, a rear end, and two sides;
   a travelling mechanism for turning said frame and moving said frame forwards, backwards, and sideways;
   a dynamic source for driving said travelling mechanism;

an electric power source for storing and supplying a required power;

a timer for providing a starting signal enabling said vehicle to begin operating at a desired time;

a plurality of wire sensors for sensing a signal from said guiding signal device and producing a wire location signal;

a distance measuring device for measuring a distance between said vehicle and obstacles and producing an obstacle signal;

a margin sensor mounted for sensing a boundary location between an already operated area and a non-operated area and producing a boundary location signal;

a microcomputer, having stored control programs, for controlling the operation of said vehicle; wherein said vehicle starts automatically when it receives said starting signal, and according to said guiding signal device, travels from the parking location to the job site, operates over the job site in a parallel reciprocating manner, and returns to the parking location.

2. An automatic working vehicular system according to claim 1, further comprising a remote control signal unit, controlled by said microcomputer, for producing remote control signals before departing from the parking location and after returning thereto.

3. An automatic working vehicular system according to claim 1, wherein said microcomputer comprises:
   a means for controlling said vehicle to move along said first wire from the parking location to the job site;
   a means for controlling said vehicle to move along said second wire from the first corner to the second corner of the job site;
   a means for controlling said vehicle to move sideways one operational width at the second corner of the job site;
   a means for controlling said vehicle one of forward or backward according to the boundary location signal from said margin detector until receiving another wire location signal;
   a means for controlling said vehicle to repeat sideways movement upon receiving the wire location signal and one of forward and backward movement according to the boundary location signal in a parallel reciprocating manner until one of encountering said third wire and completing a job;
   a means for controlling said vehicle, upon encountering said third wire, to continue in the parallel reciprocating manner between said third wire and said second wire until one side of the barrier is completed, and then to follow said third wire around to another side of the barrier until receiving a boundary location signal from said margin detector, and then to turn and continue in the parallel reciprocating manner; and
   a means for controlling said vehicle, upon completion of a job, to move along said second wire until receiving the wire location signal indicating said first wire and along said first wire back to the parking location.

4. An automatic working vehicular system according to claim 1, further comprising:
   a fuel detector for detecting the level of fuel remaining in said vehicle and instructing said microcomputer to interrupt the operation of said vehicle;
   a rain sensor for sensing rain and wet grounds and instructing said microcomputer to interrupt the operation of said vehicle; and
   a plurality of emergency stop switches for temporarily stopping said vehicle in an emergency and resetting said vehicle following the emergency.

5. An automatic working vehicular system according to claim 4, wherein said microcomputer, upon instruction to interrupt the operation, comprises:
   a means for controlling the vehicle to continue travel until receiving the wire location signal indicating said second wire;
   a means for controlling the vehicle to turn and move along said second wire until receiving the wire location signal indicating said first wire and along said first wire back to the parking location;
   a means for recording the vehicle's distance from an interrupt location to the parking location;
   a means for resetting said timer;
   a means for starting the vehicle again at a reset time and controlling the vehicle to move out to the job site the recorded distance to complete the job.

6. An automatic working vehicular system according to claim 1, further comprising a vibration detector for detecting when said vehicle is touched and producing a warning signal.

7. An automatic working vehicular system according to claim 6, further comprising an operation and display panel for displaying operational information, enabling manual and automatic operations to be set, and receiving a user code.

8. An automatic working vehicular system according to claim 7, further comprising an alarm for sending out an alarm signal when said microcomputer receives one of the obstacle signal from said distance measuring device, the warning signal from said vibration detector, and a bad user signal produced from the input of several incorrect user codes at said operation and display panel.

9. An automatic lawn mowing system comprising:
(1) a guiding signal device comprising:
   a signal generator for generating a plurality of alternating currents having at least three different frequencies;
   a first wire carrying an alternating current at a first frequency, said first wire loops from said signal generator at a parking location to a first corner of a lawn and along one side of the lawn to a second corner thereof and back to said signal generator;
   a second wire carrying an alternating current at a second frequency, said second wire loops from said signal generator at the parking location and around an external circumference of the lawn and back to said signal generator;
   a third wire carrying an alternating current at a third frequency, said third wire loops from said signal generator at the parking location and around an external circumference of each barrier area located within the lawn; and
(2) an automatic lawn mower comprising:
   a frame having a front end and a rear end, said frame comprising a base plate having a grass outlet, a guardrail and a protective cover;
   a cutting knife for cutting grass;
   a travelling mechanism turning said frame and moving said frame forwards, backwards, and sideways, said travelling mechanism comprising pilot and driving wheels respectively mounted on the front and rear ends of said frame, a transmission, and a steering device;

an electric power source for storing and supplying a required power;

an engine for driving said frame, said travelling mechanism, and said cutting knife;

a timer for providing a starting signal enabling said lawn mower to begin operating at a desired time;

a plurality of wire sensors, having a plurality of induction coils mounted at the front and rear end of said frame, for sensing a signal from said guiding signal device and producing a wire location signal;

a distance measuring device, having a plurality of sets of supersonic transmitter and receivers mounted on said guardrail of said frame for measuring a distance between said lawn mower and obstacles and producing an obstacle signal;

a plurality of grass-length sensors, having a plurality of sensing probes mounted at the front and rear end of said frame, for sensing a boundary location between an area that has already been mowed and an area that has not been mowed and producing a grass boundary location signal;

a microcomputer, having stored control programs, for controlling the operation of said lawn mower;

a remote control signal unit, controlled by said microcomputer, for producing remote control signals before departing from the parking location and after returning thereto;

a fuel detector for detecting the level of fuel remaining in said lawn mower and instructing said microcomputer to interrupt the operation of said lawn mower;

a rain sensor for sensing rain and wet grounds and instructing said microcomputer to interrupt the operation of said lawn mower;

a plurality of emergency stop switches for temporarily stopping said lawn mower in an emergency and resetting said lawn mower following the emergency;

a vibration detector for detecting when said lawn mower is touched and producing a warning signal;

an operation and display panel for displaying necessary operational information, enabling manual and automatic operations to be set, and receiving a user code;

an alarm for sending out an alarm signal when said microcomputer receives one of the obstacle signal from said distance measuring device, the warning signal from said vibration detector, and a bad user signal produced from the input of several incorrect user codes at said operation and display panel;

wherein said microcomputer comprises:

a means for starting said engine and turning on said electric power source upon receiving one of a correct user code from said operation and display panel and the starting signal from said timer;

a means for controlling the remote control signal device to open and close a door to the parking location;

a means for controlling said lawn mower to move out of the parking location along said first wire, turn around, then proceed to the first corner of the lawn;

a means for controlling said lawn mower to move along said second wire and cut grass from the first corner to the second corner of the lawn;

a means for controlling said lawn mower to move sideways one operational width at the second corner of the lawn;

a means for controlling said lawn mower one of forward or backward according to the grass boundary location signal from said grass-length detector until receiving another wire location signal;

a means for controlling said lawn mower to repeat sideways movement upon receiving the wire location signal and one of forward and backward movement according to the grass boundary location signal in a parallel reciprocating manner until one of encountering said third wire and completely mowing the lawn;

a means for controlling said lawn mower, upon encountering said third wire, to continue in the parallel reciprocating manner between said third wire and said second wire until one side of the barrier is mowed, and then to follow said third wire around to another side of the barrier until receiving a grass boundary location signal from said grass-length detector, and then to turn and continue in the parallel reciprocating manner;

a means for controlling said lawn mower, upon completion of the lawn, to move along said second wire until receiving the wire location signal indicating said first wire and along said first wire back to the parking location;

a means for stopping upon receiving the obstacle signal from said distance measuring device and warning with said alarm a moving obstacle;

a means for controlling the vehicle, upon instruction to interrupt the operation, to continue travel until receiving the wire location signal indicating said second wire, to turn and move along said second wire until receiving the wire location signal indicating said first wire and along said first wire back to the parking location, to record the lawn mower's distance from an interrupt location to the parking location, to reset said timer, to restart the lawn mower again at a reset time, and to move out to the lawn the recorded distance to finish mowing the lawn; and a means for controlling the speed of the vehicle.

* * * * *